C. H. PHINNEY.
Revolution-Indicator.

No. 169,117. Patented Oct. 26, 1875.

WITNESSES:
John R. Heard
D. W. Foster

INVENTOR:
Charles H. Phinney
by Alban Andrew
his atty.

UNITED STATES PATENT OFFICE.

CHARLES H. PHINNEY, OF BOSTON, MASSACHUSETTS.

IMPROVEMENT IN REVOLUTION-INDICATORS.

Specification forming part of Letters Patent No. 169,117, dated October 26, 1875; application filed November 17, 1874.

*To all whom it may concern:*

Be it known that I, CHARLES H. PHINNEY, of Boston, in the county of Suffolk and State of Massachusetts, have invented certain new and useful Improvements in Revolution-Indicators; and I do hereby declare that the following is a full, clear, and exact description thereof, which will enable others skilled in the art to which it pertains to make and use the same, reference being had to the accompanying drawings and to the letters of reference marked thereon, which form a part of this specification.

My invention relates to certain improvements in revolution indicators or registers; and the object of my invention is to construct such devices in such manner that they are made to occupy a very limited or small space, this object being accomplished by raising the pawl and ratchet and register at right angles to the rod, which is actuated by the hub of the wheel, which rod actuates the pawl and ratchet.

To this particular end my invention consists in a ratchet-wheel, a pawl, and a lever, loosely pivoted on the shaft of the wheel, and provided with a lug and held in its normal position by a spring, and being provided with an incline or lug, in combination with a rod provided at one end with a roller, which is operated by an incline on the hub of the wheel, and having at its other end a wedge, which operates against the lug or incline of the lever-carrying pawl, the whole being constructed and arranged as will hereinafter appear, whereby the rod is caused to impart motion to the lever and pawl of the register at right angles to said rod.

Figure 1:
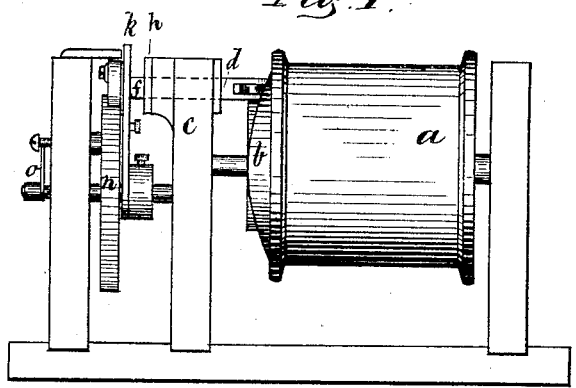
Figure 2:
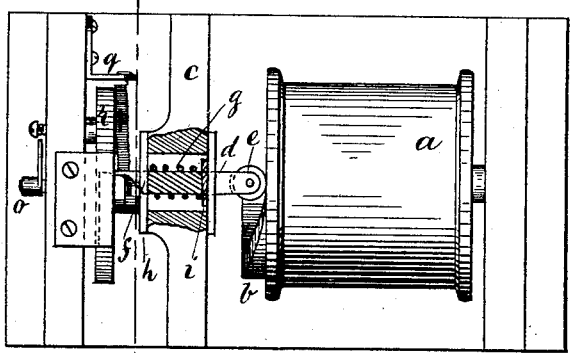
Figure 3:
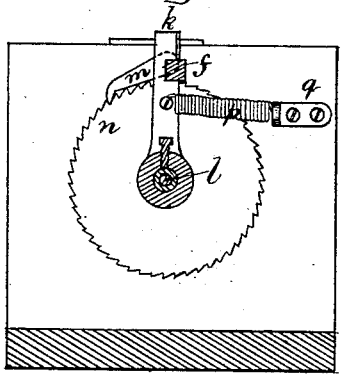

On the drawing, Figure 1 represents a side elevation of my invention. Fig. 2 represents a ground plan; and Fig. 3 represents a cross-section, on the line A B, shown in Fig. 2.

Similar letters refer to similar parts wherever they occur on the drawings.

$a$ represents a revolving body, the revolutions of which are to be indicated. A cam or projection, $b$, is located at one end of the cylinder $a$, as shown. In the support $c$ is located a movable rod, $d$, having in one end a small friction-roller, $e$, and terminating in its opposite end as a wedge or incline, $f$. (Shown in Fig. 2.) The rod $d$ is forced automatically against the end of the cylinder $a$ by means of the coiled spring $g$, surrounding the rod $d$, and exerting its pressure against a stationary plate, $h$, secured to the bearing $c$, and a pin or washer, $i$, secured to the rod $d$. The wedge or incline $f$ comes in contact with the pawl-carrying lever $k$, that is hung loosely on an index-shaft, $l$, or in a similar manner. A pawl, $m$, is hinged to the upper end of the lever $k$, and engages with a toothed wheel, $n$, secured to the shaft $l$. A finger or index, $o$, is secured to the outer end of the shaft $l$ in the ordinary way. The pawl $m$ is moved forward, and with it the toothed wheel $n$, when the cam $b$ forces the rod $d$ outward, when the wedge or incline $f$, by its contact with the lever $k$, produces a lateral motion of the latter. When the rod $d$ is automatically forced toward the end of the cylinder $a$ by means of the coiled spring $g$, the lever $k$ and pawl $m$ are moved back again to their original positions by means of a coiled spring, $p$, secured in one end to the lever $k$, and in the other to a stationary support, $q$. (Shown in Figs. 2 and 3.)

It should be observed that by the above I am enabled to construct the register so that it will be very compact and occupy but a very small space, this being accomplished, as before stated, by arranging the pawl and ratchet and register at right angles to the rod, which is actuated by the hub of the wheel, which in turn operates the pawl and ratchet.

I am aware that patents have heretofore been granted to J. L. Martin, June 17, 1856, and to Wm. Oldroyd, November 14, 1848, for revolution-indicators, in which a cam or projection is used on the revolving body in combination with a registering apparatus; and I therefore disclaim, broadly, the inventions set forth in the aforesaid patents; but What I wish to secure by Letters Patent, and claim, is—

1. The ratchet-wheel $n$, pawl $m$, and its lever $k$, pivoted on the shaft of the wheel, and provided with incline or lug $f$, in combination with and actuated by rod $d$, provided with an incline, all arranged as shown, so that the rod $d$ gives motion to the lever and pawl in a direction at right angles to itself, substantially as described.

2. The combination, with a revolving body, $a$, having at its end a cam, $b$, of the horizontal rod $d$, provided with the reacting spring $g$ and roller $e$, on which the cam operates, and an inclined plane, $f$, and the pawl-carrying lever $k$, having incline $f$ and pawl $m$, to actuate the ratchet-wheel $n$, the said lever $k$ being provided with a reacting spring, all as herein shown and described.

In testimony that I claim the foregoing as my own invention, I have affixed my signature in presence of two witnesses.

CHARLES H. PHINNEY.

Witnesses:
ALBAN ANDRÉN,
JOHN R. HEARD.